US012052558B2

(12) United States Patent
Villemoes

(10) Patent No.: US 12,052,558 B2
(45) **Date of Patent: *Jul. 30, 2024**

(54) BINAURAL MULTI-CHANNEL DECODER IN THE CONTEXT OF NON-ENERGY-CONSERVING UPMIX RULES

(71) Applicant: DOLBY INTERNATIONAL AB, Dublin (IE)

(72) Inventor: Lars Villemoes, Jarfalla (SE)

(73) Assignee: DOLBY INTERNATIONAL AB, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 18/117,267

(22) Filed: Mar. 3, 2023

(65) Prior Publication Data

US 2023/0209291 A1 Jun. 29, 2023

Related U.S. Application Data

(60) Continuation of application No. 17/110,903, filed on Dec. 3, 2020, now Pat. No. 11,601,773, which is a (Continued)

(51) Int. Cl.
*H04S 7/00* (2006.01)
*G10L 19/008* (2013.01)

(52) U.S. Cl.
CPC .............. *H04S 7/30* (2013.01); *G10L 19/008* (2013.01); *H04S 7/307* (2013.01); (Continued)

(58) Field of Classification Search
CPC ..... G10L 19/008; G10L 19/167; H04S 3/008; H04S 2400/03; H04S 2420/03; H04S 2400/01; H04S 5/00; H04S 3/02
(Continued)

(56) References Cited

U.S. PATENT DOCUMENTS 3,571,794 A * 3/1971 Tong .................... H03M 13/17 714/775
5,610,986 A 3/1997 Miles
(Continued)

FOREIGN PATENT DOCUMENTS

CN 1497586 5/2004
CN 1758337 4/2006
(Continued)

OTHER PUBLICATIONS

Herre, MPEG Surround—The ISOMPEG Standard for Efficient and Compatible Multi Channel Audio Coding, May 2007, AES 122nd Convention, Vienna, Austria, pp. 1-23.
(Continued)

*Primary Examiner* — Alexander Krzystan

(57) ABSTRACT

A multi-channel decoder for generating a binaural signal from a downmix signal using upmix rule information on an energy-error introducing upmix rule for calculating a gain factor based on the upmix rule information and characteristics of head related transfer function based filters corresponding to upmix channels. The one or more gain factors are used by a filter processor for filtering the downmix signal so that an energy corrected binaural signal having a left binaural channel and a right binaural channel is obtained.

4 Claims, 9 Drawing Sheets

Related U.S. Application Data division of application No. 16/583,184, filed on Sep. 25, 2019, now Pat. No. 10,863,299, which is a division of application No. 16/216,884, filed on Dec. 11, 2018, now Pat. No. 10,469,972, which is a division of application No. 15/611,346, filed on Jun. 1, 2017, now abandoned, which is a continuation of application No. 14/447,054, filed on Jul. 30, 2014, now Pat. No. 9,699,585, which is a continuation of application No. 12/979,192, filed on Dec. 27, 2010, now Pat. No. 8,948,405, which is a division of application No. 11/469,818, filed on Sep. 1, 2006, now Pat. No. 8,027,479.

(60) Provisional application No. 60/803,819, filed on Jun. 2, 2006.

(52) U.S. Cl.
CPC ....... *H04S 2400/01* (2013.01); *H04S 2400/03* (2013.01); *H04S 2420/01* (2013.01); *H04S 2420/03* (2013.01)

(58) Field of Classification Search
USPC ............ 381/17, 20, 21, 22, 23, 310; 700/94
See application file for complete search history.

(56) References Cited

U.S. PATENT DOCUMENTS

| | | | | |
|---|---|---|---|---|
| 5,727,068 | A * | 3/1998 | Karagosian | H04S 3/00 381/20 |
| 6,757,659 | B1 | 6/2004 | Tanaka et al. | |
| 7,394,903 | B2 | 7/2008 | Herre et al. | |
| 7,447,317 | B2 | 11/2008 | Herre | |
| 8,325,929 | B2 * | 12/2012 | Koppens | G10L 19/008 381/1 |
| 8,948,405 | B2 * | 2/2015 | Villemoes | H04S 7/30 381/22 |
| 10,015,614 | B2 | 7/2018 | Villemoes | |
| 2003/0035553 | A1 | 2/2003 | Baumgarte et al. | |
| 2004/0236583 | A1 | 11/2004 | Tanaka et al. | |
| 2005/0074127 | A1 | 4/2005 | Herre et al. | |
| 2005/0117762 | A1 | 6/2005 | Sakurai | |
| 2005/0157883 | A1 | 7/2005 | Herre et al. | |
| 2005/0160126 | A1 | 7/2005 | Bruhn et al. | |
| 2005/0276420 | A1 | 12/2005 | Davis | |
| 2006/0009225 | A1 | 1/2006 | Herre et al. | |
| 2006/0023891 | A1 | 2/2006 | Henn et al. | |
| 2006/0083385 | A1 | 4/2006 | Allamanche et al. | |
| 2006/0093152 | A1 | 5/2006 | Thompson et al. | |
| 2006/0093164 | A1 | 5/2006 | Reams et al. | |
| 2006/0106620 | A1 | 5/2006 | Thompson | |
| 2006/0116886 | A1 | 6/2006 | Kim et al. | |
| 2006/0153408 | A1 * | 7/2006 | Faller | G10L 19/008 381/307 |
| 2006/0165237 | A1 | 7/2006 | Villemoes et al. | |
| 2006/0233379 | A1 * | 10/2006 | Villemoes | G10L 19/008 381/23 |
| 2007/0160218 | A1 | 7/2007 | Jakka | |
| 2007/0223708 | A1 * | 9/2007 | Villemoes | H04S 3/004 381/17 |
| 2007/0223749 | A1 * | 9/2007 | Kim | H04R 5/02 381/23 |
| 2007/0280485 | A1 * | 12/2007 | Villemoes | H04S 7/307 381/119 |
| 2007/0291951 | A1 * | 12/2007 | Faller | H04S 3/008 381/119 |
| 2008/0187484 | A1 | 8/2008 | Diefenbacher et al. | |
| 2009/0043591 | A1 * | 2/2009 | Breebaart | G10L 19/008 704/500 |
| 2009/0225991 | A1 | 9/2009 | Oh et al. | |
| 2009/0232317 | A1 * | 9/2009 | Emerit | H04S 1/007 381/17 |
| 2009/0279706 | A1 * | 11/2009 | Takashima | H04S 3/008 381/17 |
| 2009/0299734 | A1 * | 12/2009 | Zhou | G10L 19/008 704/201 |
| 2011/0091046 | A1 | 4/2011 | Villemoes | |
| 2014/0343954 | A1 * | 11/2014 | Villemoes | H04S 7/30 704/500 |

FOREIGN PATENT DOCUMENTS

| | | |
|---|---|---|
| JP | 2006-500817 | 1/2006 |
| WO | WO2004/028204 | 4/2004 |
| WO | 2005/036925 | 4/2005 |
| WO | 2005/069274 | 7/2005 |
| WO | 2006/045371 | 5/2006 |
| WO | 2006/048203 | 5/2006 |

OTHER PUBLICATIONS

J Breebaart, "MPEG Spatial Audio Coding/ MPEG Surround: Overview and Current Status", Audio Engineering Society Convention Paper 6599, Presented at the 119.sup.th Convention, Oct. 7-10, 2005, New York, NY, pp. 1-17.

Villemoes L. et al., "MPEG Surround: the forthcoming ISO standard for spatial audio coding coding" Proceedings of the 28.sup.th International AES Conference, Pitea, Sweden, Jun. 30, 2006, pp. 1-18.

* cited by examiner

Conventional binaural synthesis using HRTFs

MPEG surround encoder

Cascade of MPEG surround decoder and binaural synthesizer (without gain factor correction)

$$\begin{bmatrix} L \\ R \\ C \end{bmatrix} = \begin{bmatrix} m_{11} & m_{12} \\ m_{21} & m_{22} \\ m_{31} & m_{32} \end{bmatrix} \begin{bmatrix} L_0 \\ R_0 \end{bmatrix}$$

upmix rule (determined e.g. by Fig. 20 encoder)
$m_{11}$, $m_{21}$, $m_{31}$: upmix-left
$m_{12}$, $m_{22}$, $m_{32}$: upmix-right $$g_L \approx \sqrt{E_L^B / E_L^B - \Delta E_L^B},$$
$$g_R \approx \sqrt{E_R^B / E_R^B - \Delta E_R^B};$$

$$\Delta E = f(\|\sum_{i=11,5,13,12,6,14} HRTF_i\|)$$
$$E = f(\|\sum HRTF_i\|)$$

BINAURAL MULTI-CHANNEL DECODER IN THE CONTEXT OF NON-ENERGY-CONSERVING UPMIX RULES

CROSS-REFERENCE TO RELATED APPLICATIONS

This application is a continuation of U.S. patent application Ser. No. 17/110,903 filed Dec. 3, 2020, which is a divisional of U.S. patent application Ser. No. 16/583,184 filed Sep. 25, 2019, which issued as U.S. Pat. No. 10,863, 299 on Dec. 8, 2020, which is a divisional of U.S. patent application Ser. No. 16/216,884 filed Dec. 11, 2018, issued as U.S. Pat. No. 10,469,972, which is a divisional of U.S. patent application Ser. No. 15/611,346 filed Jun. 1, 2017, which is a continuation of U.S. patent application Ser. No. 14/447,054 filed Jul. 30, 2014, issued as U.S. Pat. No. 9,699,585, which is a continuation of U.S. patent application Ser. No. 12/979,192, filed Dec. 27, 2010, issued as U.S. Pat. No. 8,948,405, which is a divisional of U.S. patent application Ser. No. 11/469,818 filed Sep. 1, 2006, issued as U.S. Pat. No. 8,027,479, which claims priority to U.S. patent application Ser. No. 60/803,819 filed Jun. 2, 2006, each of which is incorporated herein in its entirety by this reference made thereto.

FIELD OF THE INVENTION

The present invention relates to binaural decoding of multi-channel audio signals based on available downmixed signals and additional control data, by means of HRTF filtering.

BACKGROUND OF THE INVENTION AND PRIOR ART

Recent development in audio coding has made methods available to recreate a multi-channel representation of an audio signal based on a stereo (or mono) signal and corresponding control data. These methods differ substantially from older matrix based solution such as Dolby Prologic, since additional control data is transmitted to control the re-creation, also referred to as up-mix, of the surround channels based on the transmitted mono or stereo channels.

Hence, such a parametric multi-channel audio decoder, e.g. MPEG Surround reconstructs N channels based on M transmitted channels, where N>M, and the additional control data. The additional control data represents a significantly lower data rate than that required for transmission of all N channels, making the coding very efficient while at the same time ensuring compatibility with both M channel devices and N channel devices. [J. Breebaart et al. "MPEG spatial audio coding/MPEG Surround: overview and current status", Proc. 119th AES convention, New York, USA, October 2005, Preprint 6447].

These parametric surround coding methods usually comprise a parameterization of the surround signal based on Channel Level Difference (CLD) and Inter-channel coherence/cross-correlation (ICC). These parameters describe power ratios and correlation between channel pairs in the up-mix process. Further Channel Prediction Coefficients (CPC) are also used in prior art to predict intermediate or output channels during the up-mix procedure.

Other developments in audio coding have provided means to obtain a multi-channel signal impression over stereo headphones. This is commonly done by downmixing a multi-channel signal to stereo using the original multi-channel signal and HRTF (Head Related Transfer Functions) filters.

Alternatively, it would, of course, be useful for computational efficiency reasons and also for audio quality reasons to short-cut the generation of the binaural signal having the left binaural channel and the right binaural channel.

However, the question is how the original HRTF filters can be combined. Further a problem arises in a context of an energy-loss-affected upmixing rule, i.e., when the multi-channel decoder input signal includes a downmix signal having, for example, a first downmix channel and a second downmix channel, and further having spatial parameters, which are used for upmixing in a non-energy-conserving way. Such parameters are also known as prediction parameters or CPC parameters. These parameters have, in contrast to channel level difference parameters the property that they are not calculated to reflect the energy distribution between two channels, but they are calculated for performing a best-as-possible waveform matching which automatically results in an energy error (e.g. loss), since, when the prediction parameters are generated, one does not care about energy-conserving properties of an upmix, but one does care about having a good as possible time or subband domain waveform matching of the reconstructed signal compared to the original signal.

When one would simply linearly combine HRTF filters based on such transmitted spatial prediction parameters, one will receive artifacts which are especially serious, when the prediction of the channels performs poorly. In that situation, even subtle linear dependencies lead to undesired spectral coloring of the binaural output. It has been found out that this artifact occurs most frequently when the original channels carry signals that are pairwise uncorrelated and have comparable magnitudes.

SUMMARY OF THE INVENTION

It is the object of the present invention to provide an efficient and qualitatively acceptable concept for multi-channel decoding to obtain a binaural signal which can be used, for example, for headphone reproduction of a multi-channel signal.

In accordance with the first aspect of the present invention, this object is achieved by a multi-channel decoder for generating a binaural signal from a downmix signal derived from an original multi-channel signal using parameters including an upmix rule information useable for upmixing the downmix signal with an upmix rule, the upmix rule resulting in an energy-error, comprising: a gain factor calculator for calculating at least one gain factor for reducing or eliminating the energy-error, based on the upmix rule information and filter characteristics of a head related transfer function based filters corresponding to upmix channels, and a filter processor for filtering the downmix signal using the at least one gain factor, the filter characteristics and the upmix rule information to obtain an energy-corrected binaural signal.

In accordance with a second aspect of this invention, this object is achieved by a method of multi-channel decoding Further aspects of this invention relate to a computer program having a computer-readable code which implements, when running on a computer, the method of multi-channel decoding.

The present invention is based on the finding that one can even advantageously use up-mix rule information on an upmix resulting in an energy error for filtering a downmix signal to obtain a binaural signal without having to fully render the multichannel signal and to subsequently apply a huge number of HRTF filters. Instead, in accordance with the present invention, the upmix rule information relating to an energy-error-affected upmix rule can advantageously be used for short-cutting binaural rendering of a downmix signal, when, in accordance with the present invention, a gain factor is calculated and used when filtering the downmix signal, wherein this gain factor is calculated such that the energy error is reduced or completely eliminated.

Particularly, the gain factor not only depends on the information on the upmix rule such as the prediction parameters, but, importantly, also depends on head related transfer function based filters corresponding to upmix channels, for which the upmix rule is given. Particularly, these upmix channels never exist in the preferred embodiment of the present invention, since the binaural channels are calculated without firstly rendering, for example, three intermediate channels. However, one can derive or provide HRTF based filters corresponding to the upmix channels although the upmix channels themselves never exist in the preferred embodiment. It has been found out that the energy error introduced by such an energy-loss-affected upmix rule not only corresponds to the upmix rule information which is transmitted from the encoder to the decoder, but also depends on the HRTF based filters so that, when generating the gain factor, the HRTF based filters also influence the calculation of the gain factor.

In view of that, the present invention accounts for the interdependence between upmix rule information such as prediction parameters and the specific appearance of the HRTF based filters for the channels which would be the result of upmixing using the upmix rule.

Thus, the present invention provides a solution to the problem of spectral coloring arising from the usage of a predictive upmix in combination with binaural decoding of parametric multi-channel audio.

Preferred embodiments of the present invention comprise the following features: an audio decoder for generating a binaural audio signal from M decoded signals and spatial parameters pertinent to the creation of N>M channels, the decoder comprising a gain calculator for estimating, in a multitude of subbands, two compensation gains from P pairs of binaural subband filters and a subset of the spatial parameters pertinent to the creation of P intermediate channels, and a gain adjuster for modifying, in a multitude of subbands, M pairs of binaural subband filters obtained by linear combination of the P pairs of binaural subband filters, the modification consisting of multiplying each of the M pairs with the two gains computed by the gain calculator.

BRIEF DESCRIPTION OF THE DRAWINGS

The present invention will now be described by way of illustrative examples, not limiting the scope or spirit of the invention, with reference to the accompanying drawings, in which.

DETAILED DESCRIPTION OF PREFERRED EMBODIMENTS

Before discussing the inventive gain adjusting aspect in detail, a combination of HRTF filters and usage of HRTF-based filters will be discussed in connection with FIGS. 7 to 11.

In order to better outline the features and advantages of the present invention a more elaborate description is given first. A binaural synthesis algorithm is outlined in FIG. 7. A set of input channels is filtered by a set of HRTFs. Each input signal is split in two signals (a left 'L', and a right 'R' component); each of these signals is subsequently filtered by an HRTF corresponding to the desired sound source position. All left-ear signals are subsequently summed to generate the left binaural output signal, and the right-ear signals are summed to generate the right binaural output signal.

The HRTF convolution can be performed in the time domain, but it is often preferred to perform the filtering in the frequency domain due to computational efficiency. In that case, the summation as shown in FIG. 7 is also performed in the frequency domain.

Figure 7:
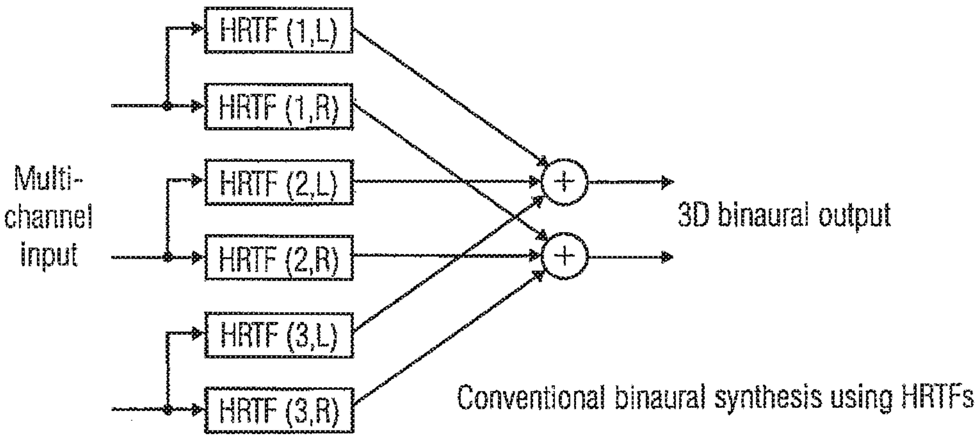
FIG. 7 illustrates a conventional binaural synthesis using HRTFs.
Figure 8:
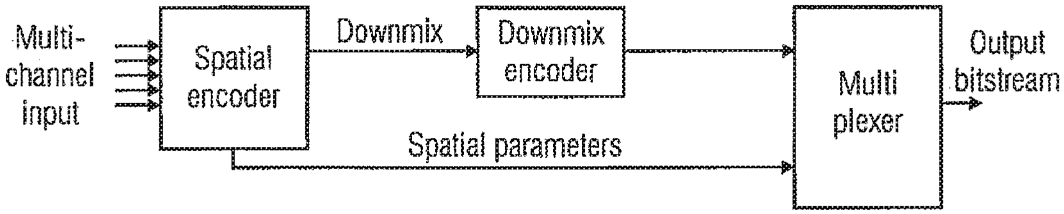
FIG. 8 illustrates a MPEG surround encoder.

In principle, the binaural synthesis method as outlined in FIG. 7 could be directly used in combination with an MPEG surround encoder/decoder. The MPEG surround encoder is schematically shown in FIG. 8. A multi-channel input signal is analyzed by a spatial encoder, resulting in a mono or stereo down mix signal, combined with spatial parameters. The down mix can be encoded with any conventional mono or stereo audio codec. The resulting down-mix bit stream is combined with the spatial parameters by a multiplexer, resulting in the total output bit stream.

Figure 9:
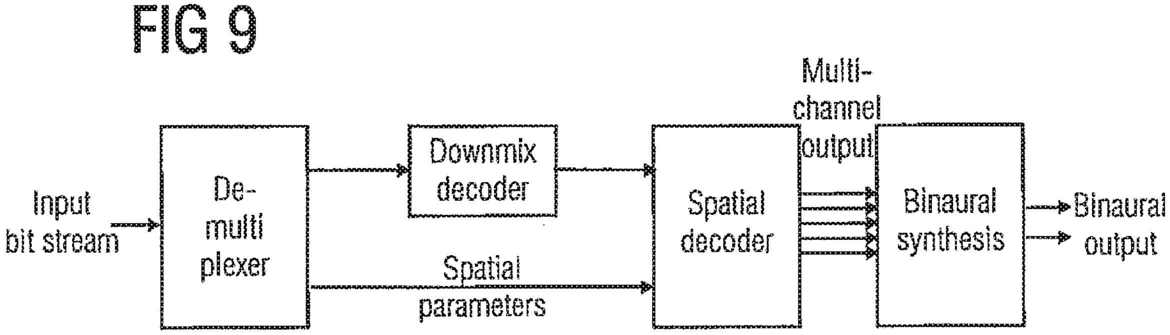
FIG. 9 illustrates cascade of MPEG surround decoder and binaural synthesizer.

A binaural synthesis scheme in combination with an MPEG surround decoder is shown in FIG. 9. The input bit stream is de-multiplexed resulting in spatial parameters and a down-mix bit stream. The latter bit stream is decoded using a conventional mono or stereo decoder. The decoded down mix is decoded by a spatial decoder, which generates a multi-channel output based on the transmitted spatial parameters. Finally, the multi-channel output is processed by a binaural synthesis stage as depicted in FIG. 7, resulting in a binaural output signal.

There are however at least three disadvantages of such a cascade of an MPEG surround decoder and a binaural synthesis module:

- A multi-channel signal representation is computed as an intermediate step, followed by HRTF convolution and downmixing in the binaural synthesis step. Although HRTF convolution should be performed on a per channel basis, given the fact that each audio channel can have a different spatial position, this is an undesirable situation from a complexity point of view.
- The spatial decoder operates in a filterbank (QMF) domain. HRTF convolution, on the other hand, is typically applied in the FFT domain. Therefore, a cascade of a multi-channel QMF synthesis filterbank, a multi-channel DFT transform, and a stereo inverse DFT transform is necessary, resulting in a system with high computational demands.
- Coding artifacts created by the spatial decoder to create a multi-channel reconstruction will be audible, and possibly enhanced in the (stereo) binaural output.

Figure 11:
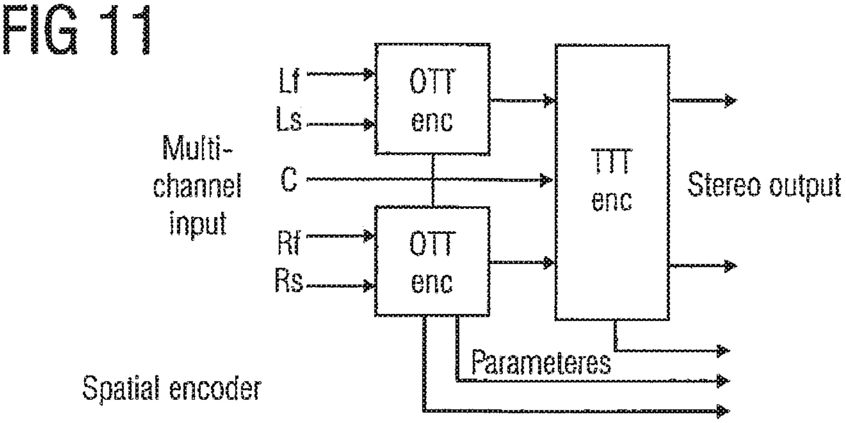
FIG. 11 illustrates a spatial encoder for certain configurations.

The spatial encoder is shown in FIG. 11. A multi-channel input signal consisting of Lf, Ls, C, Rf and Rs signals, for the left-front, left-surround, center, right-front and right-surround channels is processed by two 'OTT' units, which both generate a mono down mix and parameters for two input signals. The resulting down-mix signals, combined with the center channel are further processed by a 'ITT' (Two-To-Three) encoder, generating a stereo down mix and additional spatial parameters.

The parameters resulting from the 'TTT' encoder typically consist of a pair of prediction coefficients for each parameter band, or a pair of level differences to describe the energy ratios of the three input signals. The parameters of the 'OTT' encoders consist of level differences and coherence or cross-correlation values between the input signals for each frequency band.

Figure 12:
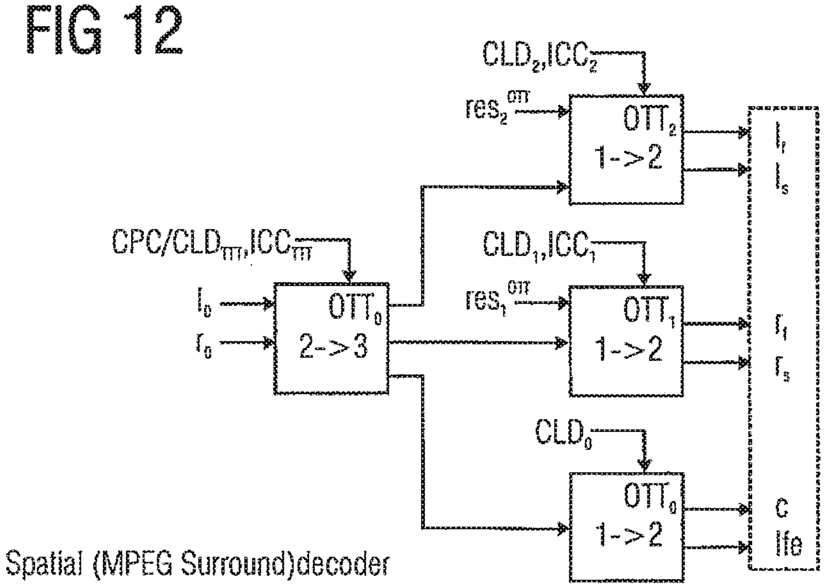
FIG. 12 illustrates a spatial (MPEG Surround) decoder.

In FIG. 12 a MPEG Surround decoder is depicted. The downmix signals 10 and r0 are input into a Two-To-Three module, that recreates a center channel, a right side channel and a left side channel. These three channels are further processed by several OTT modules (One-To-Two) yielding the six output channels.

Figure 10:
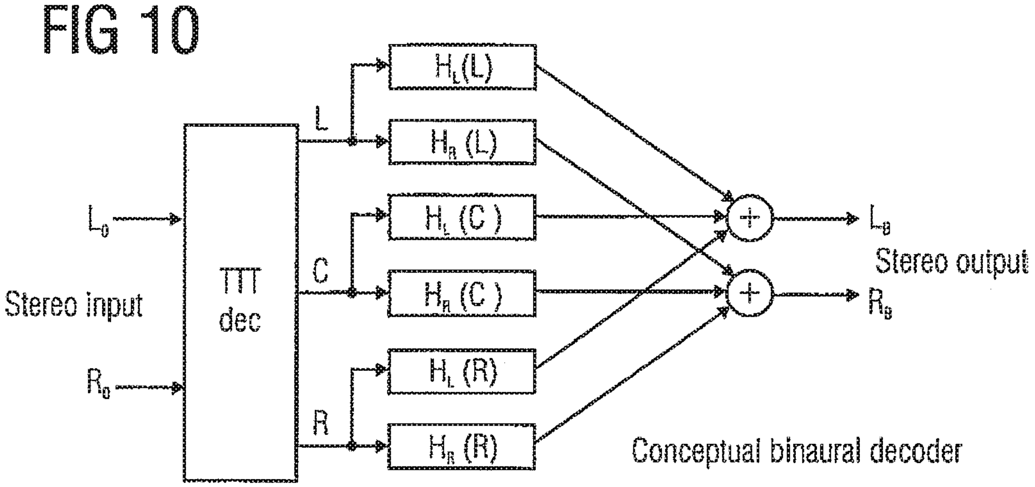
FIG. 10 illustrates a conceptual 3D binaural decoder for certain configurations.

The corresponding binaural decoder as seen from a conceptual point of view is shown in FIG. 10. Within the filterbank domain, the stereo input signal ($L_0$, $R_0$) is processed by a TTT decoder, resulting in three signals L, R and C. These three signals are subject to HRTF parameter processing. The resulting 6 channels are summed to generate the stereo binaural output pair ($L_b$, $R_b$).

The TTT decoder can be described as the following matrix operation:

$$\begin{bmatrix} L \\ R \\ C \end{bmatrix} = \begin{bmatrix} m_{11} & m_{12} \\ m_{21} & m_{22} \\ m_{31} & m_{32} \end{bmatrix} \begin{bmatrix} L_0 \\ R_0 \end{bmatrix},$$

with matrix entries $m_{xy}$ dependent on the spatial parameters. The relation of spatial parameters and matrix entries is identical to those relations as in the 5.1-multichannel MPEG surround decoder. Each of the three resulting signals L, R, and C are split in two and processed with HRTF parameters corresponding to the desired (perceived) position of these sound sources. For the center channel (C), the spatial parameters of the sound source position can be applied directly, resulting in two output signals for center, $L_B$(C) and $R_B$(C):

$$\begin{bmatrix} L_B(C) \\ R_B(C) \end{bmatrix} = \begin{bmatrix} H_L(C) \\ H_R(C) \end{bmatrix} C.$$

For the left (L) channel, the HRTF parameters from the left-front and left-surround channels are combined into a single HRTF parameter set, using the weights $w_{lf}$ and $w_{rf}$. The resulting 'composite' HRTF parameters simulate the effect of both the front and surround channels in a statistical sense. The following equations are used to generate the binaural output pair ($L_B$, $R_B$) for the left channel:

$$\begin{bmatrix} L_B(L) \\ R_B(L) \end{bmatrix} = \begin{bmatrix} H_L(L) \\ H_R(L) \end{bmatrix} L,$$

In a similar fashion, the binaural output for the right channel is obtained according to:

$$\begin{bmatrix} L_B(R) \\ R_B(R) \end{bmatrix} = \begin{bmatrix} H_L(R) \\ H_R(R) \end{bmatrix} R,$$

Given the above definitions of $L_B$(C), $R_B$(C), $L_B$(L), $R_B$(L), $L_B$(R) and $R_B$(R), the complete $L_B$ and $R_B$ signals can be derived from a single 2 by 2 matrix given the stereo input signal:

$$\begin{bmatrix} L_B \\ R_B \end{bmatrix} = \begin{bmatrix} h_{11} & h_{12} \\ h_{21} & h_{22} \end{bmatrix} \begin{bmatrix} L_0 \\ R_0 \end{bmatrix},$$

with $$h_{11} = m_{11}H_L(L) + m_{21}H_L(R) + m_{31}H_L(C),$$

$$h_{12} = m_{12}H_L(L) + m_{22}H_L(R) + m_{32}H_L(C),$$

$$h_{21} = m_{11}H_R(L) + m_{21}H_R(R) + m_{31}H_R(C),$$

$$h_{22} = m_{12}H_R(L) + m_{22}H_R(R) + m_{32}H_R(C).$$

The Hx(Y) filters can be expressed as parametric weighted combinations of parametric versions of the original HRTF filters. In order for this to work, the original HRTF filters are expressed as a

- An (average) level per frequency band for the left-ear impulse response;

An (average) level per frequency band for the right-ear impulse response;

An (average) arrival time or phase difference between the left-ear and right-ear impulse response.

Hence, the HRTF filters for the left and right ear given the center channel input signal is expressed as:

$$\begin{bmatrix} H_L(C) \\ H_R(C) \end{bmatrix} = \begin{bmatrix} P_l(C)e^{+j\phi(C)/2} \\ P_r(C)e^{-j\phi(C)/2} \end{bmatrix},$$

where $P_l(C)$ is the average level for a given frequency band for the left ear, and $\phi(C)$ is the phase difference.

Hence, the HRTF parameter processing simply consists of a multiplication of the signal with $P_l$ and $P_r$ corresponding to the sound source position of the center channel, while the phase difference is distributed symmetrically. This process is performed independently for each QMF band, using the mapping from HRTF parameters to QMF filterbank on the one hand, and mapping from spatial parameters to QMF band on the other hand.

Similarly the HRTF filters for the left and right ear given the left channel and right channel are given by:

$$H_L(L)=\sqrt{w_{lf}^{2}P_l^{2}(Lf)+w_{ls}^{2}P_l^{2}(Ls)},$$

$$H_R(L)=e^{-j(w_{lf}^2\phi(lf)+w_{ls}^2\phi(ls))}\sqrt{w_{lf}^{2}P_r^{2}(Lf)+w_{ls}^{2}P_r^{2}(Ls)}.$$

$$H_L(R)=e^{+j(w_{rf}^2\phi(rf)+w_{rs}^2\phi(rs))}\sqrt{w_{rf}^{2}P_l^{2}(Rf)+w_{rs}^{2}P_l^{2}(Rs)},$$

$$H_R(R)=\sqrt{w_{rf}^{2}P_r^{2}(Rf)+w_{rs}^{2}P_r^{2}(Rs)}$$

Clearly, the HRTFs are weighted combinations of the levels and phase differences for the parameterized HRTF filters for the six original channels.

The weights $w_{lf}$ and $w_{ls}$ depend on the CLD parameter of the 'OTT' box for Lf and Ls:

$$w_{lf}^2 = \frac{10^{CLD_l/10}}{1+10^{CLD_l/10}},\ w_{ls}^2 = \frac{1}{1+10^{CLD_l/10}}.$$

And the weights $w_{rf}$ and $w_{rs}$ depend on the CLD parameter of the 'OTT' box for Rf and Rs:

$$w_{rf}^2 = \frac{10^{CLD_r/10}}{1+10^{CLD_r/10}},\ w_{rs}^2 = \frac{1}{1+10^{CLD_r/10}}.$$

The above approach works well for short HRTF filters that sufficiently accurate can be expressed as an average level per frequency band, and an average phase difference per frequency band. However, for long echoic HRTFs this is not the case.

The present invention teaches how to extend the approach of a 2 by 2 matrix binaural decoder to handle arbitrary length HRTF filters. In order to achieve this, the present invention comprises the following steps:

Transform the HRTF filter responses to a filterbank domain;

Overall delay difference or phase difference extraction from HRTF filter pairs;

Morph the responses of the HRTF filter pair as a function of the CLD parameters

Gain adjustment

This is achieved by replacing the six complex gains $H_Y(X)$ for $Y=L_0$, $R_0$ and X=L, R, C with six filters. These filters are derived from the ten filters $H_Y(X)$ for $Y=L_0$, $R_0$ and X=Lf, Ls, Rf, Rs, C, which describe the given HRTF filter responses in the QMF domain. These QMF representations can be achieved according to the method described below.

The morphing of the front and surround channel filters is performed with a complex linear combination according to $$H_Y(X)=gw_f\exp(-j\phi_{XY}w_s^{2})H_Y(Xf)+gw_s\exp(j\phi_{XY}w_f^{2})H_Y(Xs).$$

The phase parameter $\phi_{XY}$ can be defined from the main delay time difference $\tau_{XY}$ between the front and back HRTF filters and the subband index n of the QMF bank via $$\phi_{XY} = \frac{\pi\left(n+\frac{1}{2}\right)}{64}\tau_{XY},$$

The role of this phase parameter in the morphing of filters is twofold. First, it realizes a delay compensation of the two filters prior to superposition which leads to a combined response which models a main delay time corresponding to a source position between the front and the back speakers. Second, it makes the necessary gain compensation factor g much more stable and slowly varying over frequency than in the case of simple superposition with $\phi_{XY}=0$.

The gain factor g is determined by the same incoherent addition power rule as for the parametric HRTF case, $$P_Y(X)^2=w_f^2P_Y(Xf)^2+w_s^2P_Y(Xs)^2,$$

where $$P_Y(X)^2=g^2(w_f^2P_Y(Xf)^2+w_s^2P_Y(Xs)^2+2w_fw_sP_Y(Xf)P_Y(Xs)\rho_{XY})$$

and $\rho_{XY}$ is the real value of the normalized complex cross correlation between the filters $$\exp(-j\phi_{XY})H_Y(Xf) \text{ and } H_Y(Xs).$$

In the case of simple superposition with $\phi_{XY}=0$, the value of $\rho_{XY}$ varies in an erratic and oscillatory manner as a function of frequency, which leads to the need for extensive gain adjustment. In practical implementation it is necessary to limit the value of the gain g and a remaining spectral colorization of the signal cannot be avoided.

In contrast, the use of morphing with a delay based phase compensation as taught by the present invention leads to a smooth behavior of $\rho_{XY}$ as a function of frequency. This value is often even close to one for natural HRTF derived filter pairs since they differ mainly in a delay and amplitude, and the purpose of the phase parameter is to take the delay difference into account in the QMF filterbank domain.

An alternative beneficial choice of phase parameter $\phi_{XY}$ is given by computing the phase angle of the normalized complex cross correlation between the filters $$H_Y(Xf) \text{ and } H_Y(Xs),$$

and unwrapping the phase values with standard unwrapping techniques as a function of the subband index n of the QMF bank. This choice has the consequence that $\rho_{XY}$ is never negative and hence the compensation gain g satisfies $1/\sqrt{2}\leq g\leq 1$ for all subbands. Moreover this choice of phase parameter enables the morphing of the front and surround channel filters in situations where a main delay time difference $\tau_{XY}$ is not available.

All signals considered below are subband samples from a modulated filter bank or windowed FFT analysis of discrete time signals or discrete time signals. It is understood that these subbands have to be transformed back to the discrete time domain by corresponding synthesis filter bank operations.

Figure 1:
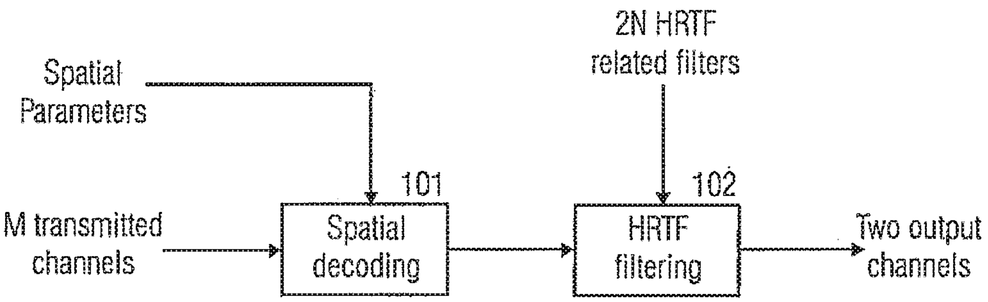
FIG. 1 illustrates binaural synthesis of parametric multichannel signals using HRTF related filters.

FIG. 1 illustrates a procedure for binaural synthesis of parametric multichannel signals using HRTF related filters. A multichannel signal comprising N channels is produced by spatial decoding 101 based on M<N transmitted channels and transmitted spatial parameters. These N channels are in turn converted into two output channels intended for binaural listening by means of HRTF filtering. This HRTF filtering 102 superimposes the results of filtering each input channel with one HRTF filter for the left ear and one HRTF filter for the right ear. All in all, this requires 2N filters. Whereas the parametric multichannel signal achieves a high quality listener experience when listened to through N loudspeakers, subtle interdependencies of the N signals will lead to artifacts for the binaural listening. These artifacts are dominated by deviation in spectral content from the reference binaural signal as defined by HRTF filtering of the original N channels prior to coding. A further disadvantage of this concatenation is that the total computational cost for binaural synthesis is the addition of the cost required for each of the components 101 and 102.

Figure 2:
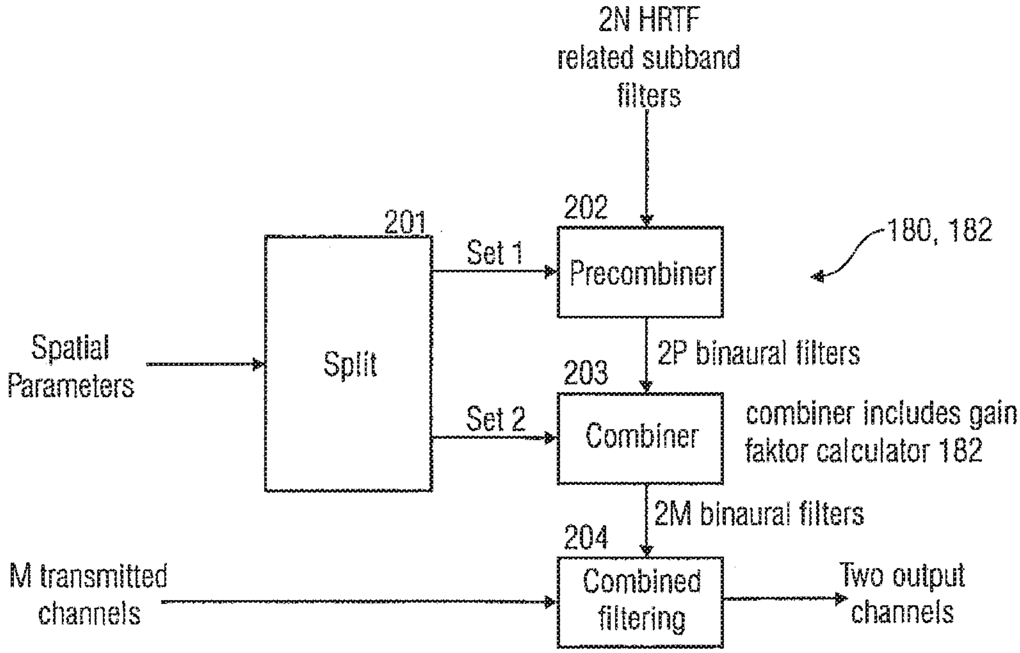
FIG. 2 illustrates binaural synthesis of parametric multichannel signals using combined filtering.

FIG. 2 illustrates binaural synthesis of parametric multichannel signals by using the combined filtering taught by the present invention. The transmitted spatial parameters are split by 201 into two sets, Set 1 and Set 2. Here, Set 2 comprises parameters pertinent to the creation of P intermediate channels from the M transmitted channels and Set 1 comprises parameters pertinent to the creation of N channels from the P intermediate channels. The prior art precombiner 202 combines selected pairs of the 2N HRTF related subband filters with weights that depend the parameter Set 1 and the selected pairs of filters. The result of this precombination is 2P binaural subband filters which represent a binaural filter pair for each of the P intermediate channels. The inventive combiner 203 combines the 2P binaural subband filters into a set of 2M binaural subband filters by applying weights that depend both on the parameter Set 2 and the 2P binaural subband filters. In comparison, a prior art linear combiner would apply weights that depend only on the parameter Set 2. The resulting set of 2M filters consists of a binaural filter pair for each of the M transmitted channels. The combined filtering unit 204 obtains a pair of contributions to the two channel output for each of the M transmitted channels by filtering with the corresponding filter pair. Subsequently, all the M contributions are added up to form a two channel output in the subband domain.

Figure 3:
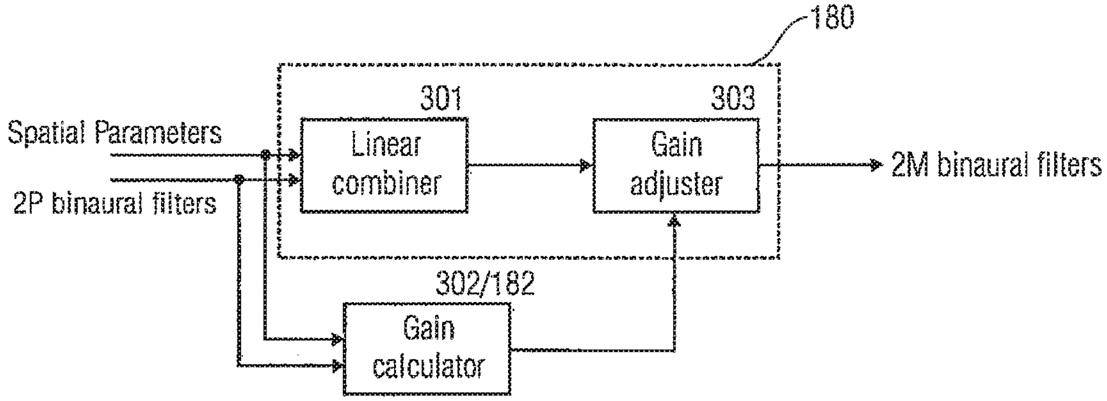
FIG. 3 illustrates the components of the inventive parameter/filter combiner.

FIG. 3 illustrates the components of the inventive combiner 203 for combination of spatial parameters and binaural filters. The linear combiner 301 combines the 2P binaural subband filters into 2M binaural filters by applying weights that are derived from the given spatial parameters, where these spatial parameters are pertinent to the creation of P intermediate channels from the M transmitted channels. Specifically, this linear combination simulates the concatenation of an upmix from M transmitted channels to P intermediate channels followed by a binaural filtering from P sources. The gain adjuster 303 modifies the 2M binaural filters output from the linear combiner 301 by applying a common left gain to each of the filters that correspond to the left ear output and by applying a common right gain to each of the filters that correspond to the right ear output. Those gains are obtained from gain calculator 302 which derives the gains from the spatial parameters and the 2P binaural filters. The purpose of the gain adjustment of the inventive components 302 and 303 is to compensate for the situation where the P intermediate channels of the spatial decoding carry linear dependencies that lead to unwanted spectral coloring due to the linear combiner 301. The gain calculator 302 taught by the present invention includes means for estimating an energy distribution of the P intermediate channels as a function of the spatial parameters.

Figure 4:
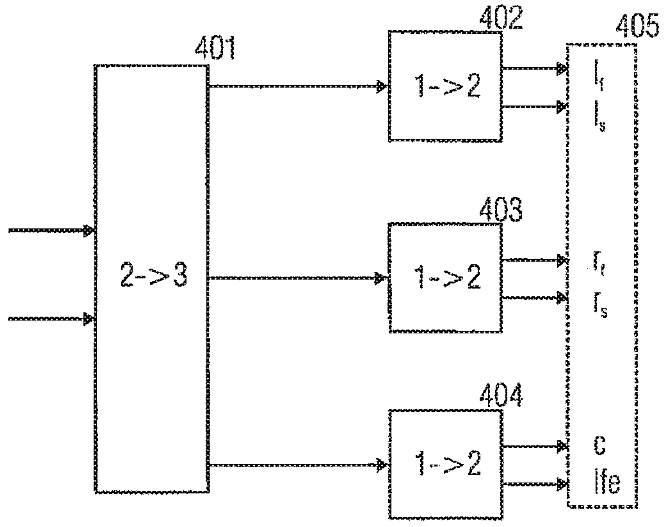
FIG. 4 illustrates the structure of MPEG Surround spatial decoding.

FIG. 4 illustrates the structure of MPEG Surround spatial decoding in the case of a stereo transmitted signal. The analysis subbands of the M=2 transmitted signals are fed into the 2→3 box 401 which outputs P=3 intermediate signals, a combined left, a combined right, and a combined center. This upmix depends on a subset of the transmitted spatial parameters which corresponds to Set 2 on FIG. 2. The three intermediate signals are subsequently fed into three 1→2 boxes 402-404 which generate a totality of N=6 signals 405: $l_f$ (left front), $l_s$ (left surround), $r_f$ (right front), $r_s$ (right surround), c (center), and lfe (low frequency extension). This upmix depends on a subset of the transmitted spatial parameters which corresponds to Set 1 on FIG. 2. The final multichannel digital audio output is created by passing the six subband signals into six synthesis filter banks.

Figure 5:
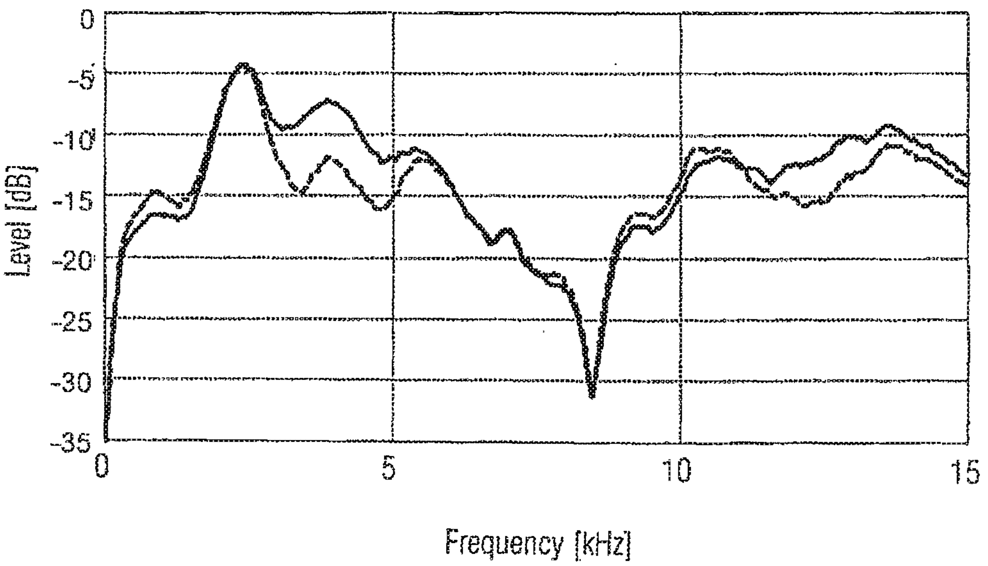
FIG. 5 illustrates the spectrum of a decoded binaural signal without the inventive gain compensation.

FIG. 5 illustrates the problem to be solved by the inventive gain compensation. The spectrum of a reference HRTF filtered binaural output for the left ear is depicted as a solid graph. The dashed graph depicts the spectrum of the corresponding decoded signal as generated by the method of FIG. 2, in the case where the combiner 203 consists of the linear combiner 301 only. As it can be seen, there is a substantial spectral energy loss relative to the desired reference spectrum in the frequency intervals 3-4 kHz and 11-13 kHz. There is also a smaller spectral boost around 1 kHz and 10 kHz.

Figure 6:
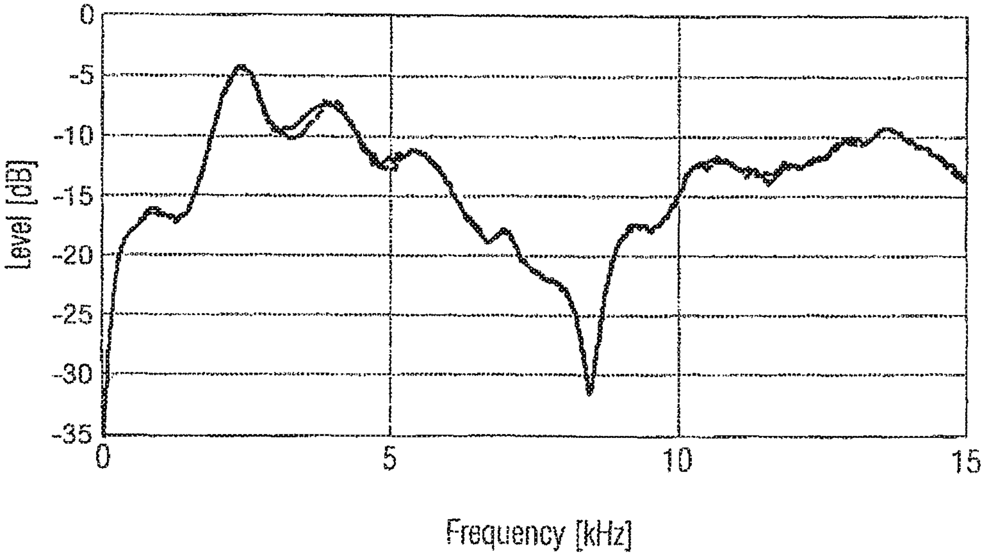
FIG. 6 illustrates the spectrum of the inventive decoding of a binaural signal.

FIG. 6 illustrates the benefit of using the inventive gain compensation. The solid graph is the same reference spectrum as in FIG. 5, but now the dashed graph depicts the spectrum of the decoded signal as generated by the method of FIG. 2, in the case where the combiner 203 consists of all the components of FIG. 3. As it can be seen, there is a significantly improved spectral match between the two curves compared to that of the two curves of FIG. 5.

In the text which follows, the mathematical description of the inventive gain compensation will be outlined. For discrete complex signals x, y, the complex inner product and squared norm (energy) is defined by $$\begin{Bmatrix} \langle x, y\rangle = \sum_k x(k)\overline{y}(k), \\ X = \|x\|^2 = \langle x, x\rangle = \sum_k |x(k)|^2, \\ Y = \|y\|^2 = \langle y, y\rangle = \sum_k |y(k)|^2, \end{Bmatrix} \tag{1}$$

where $\overline{y}$(k) denotes the complex conjugate signal of y(k).

The original multichannel signal consists of N channels, and each channel has a binaural HRTF related filter pair associated to it. It will however be assumed here that the parametric multichannel signal is created with an intermediate step of predictive upmix from the M transmitted channels to P predicted channels. This structure is used in MPEG Surround as described by FIG. 4. It will be assumed that the original set of 2N HRTF related filters have been reduced by the prior art precombiner 202 to a filter pair for each of the P predicted channels where M≤P≤N. The P predicted channel signals $\hat{x}_p$, p=1, 2, . . . , P, aim at approximating the P signals $x_p$, p=1, 2, . . . , P, which are derived from the original N channels via partial downmix. In MPEG Surround, these signals are a combined left, a combined right and a combined and scaled center/lfe channel. It is assumed that the HRTF filter pair corresponding to the signal $x_p$ is described by a subband filter $b_{1,p}$, for the left ear and a subband filter $b_{2,p}$ for the right ear. The reference binaural output signal is thus given by the linear superposition of filtered signals for n=1, 2, $$y_n(k) = \sum_{p=1}^{P} (b_{n,p} * x_p)(k), \tag{2}$$

where the star denotes convolution in the time direction. The subband filters can be given in form of finite impulse response (FIR) filters, infinite impulse response (IIR) or derived from a parameterized family of filters.

In the encoder, the downmix is formed by the application of a M×P downmix matrix D to a column vector of signals formed by $x_p$ p=1, 2, . . . , P and the prediction in the decoder is performed by the application of a P×M prediction matrix C to the column vector of signals formed by the M transmitted downmixed channels $z_m$ m=1, . . . , M, $$\hat{x}_p(k) = \sum_{m=1}^{M} c_{p,m} z_m(k), \tag{3}$$

Both matrices are known at the decoder, and ignoring the effects of coding the downmixed channels, the combined effect of prediction can be modeled by $$\hat{x}_p(k) = \sum_{q=1}^{P} a_{p,q} x_q(k), \tag{4}$$

where $a_{p,q}$ are the entries of the matrix product A=CD.

A straightforward method for producing a binaural output at the decoder is to simply insert the predicted signals $\hat{x}_p$ in (2) resulting in $$\hat{y}_n(k) = \sum_{p=1}^{P} (b_{n,p} * \hat{x}_p)(k). \tag{5}$$

In terms of computations, the binaural filtering is combined with the predictive upmix beforehand such that (5) can be written as $$\hat{y}_n(k) = \sum_{m=1}^{M} (h_{n,m} * z_m)(k), \tag{6}$$

with the combined filters defined by $$h_{n,m}(k) = \sum_{p=1}^{P} c_{p,m} b_{n,p}(k). \tag{7}$$

This formula describes the action of the linear combiner 301 which combines the coefficients $c_{p,m}$ derived from spatial parameters with the binaural subband domain filters $b_{n,p}$. When the original P signals $x_p$ have a numerical rank essentially bounded by M, the prediction can be designed to perform very well and the approximation $\hat{x}_p \approx x_p$ is valid. This happens for instance if only M of the P channels are active, or if important signal components originate from amplitude panning. In that case the decoded binaural signal (5) is a very good match to the reference (2). On the other hand, in the general case and especially in case the original P signals $x_p$ are uncorrelated, there will be a substantial prediction loss and the output from (5) can have an energy that deviates considerably from the energy of (2). As the deviation will be different in different frequency bands, the final audio output suffers from spectral coloring artifacts as described by FIG. 5. The present invention teaches how to circumvent this problem by gain compensating the output according to $$\tilde{y}_n = g_n \cdot \hat{y}_n. \tag{8}$$

In terms of computations, the gain compensation is advantageously performed by altering the combined filters according to the gain adjuster 303, $\tilde{h}_{n,m}(k) = g_n h_{n,m}(k)$. The modified combined filtering then becomes $$\tilde{y}_n(k) = \sum_{m=1}^{M} (\tilde{h}_{n,m} * z_m)(k). \tag{9}$$

The optimal values of the compensating gains in (8) are $$g_n = \frac{\|y_n\|}{\|\hat{y}_n\|}. \tag{10}$$

The purpose of the gain calculator 302 is to estimate these gains from the information available in the decoder. Several tools for this end will now be outlined. The available information is represented here by the matrix entries $a_{p,q}$ and the HRTF related subband filters $b_{n,p}$. First, the following approximation will be assumed for the inner product between signals x, y that have been filtered by HRTF related subband filters b, d, $$\langle b*x, d*y \rangle \approx \langle b,d \rangle \langle x,y \rangle. \tag{11}$$

This approximation relies on the fact that often most energy of the filters is concentrated in a dominant single tap, which in turn presupposes that the time step of the applied time frequency transform is sufficiently large in comparison to the main delay differences of HRTF filters. Applying the approximation (11) in combination with (2) leads to $$\|y_n\|^2 \approx \sum_{p,q=1}^{P} \langle b_{n,p}, b_{n,q} \rangle \langle x_p, x_q \rangle. \tag{12}$$

The next approximation consists of assuming that the original signals are uncorrelated, that is $\langle x_p, x_q \rangle = 0$ for p≠q. Then (12) reduces to $$\|y_n\|^2 \approx \sum_{p=1}^{P} \|b_{n,p}\|^2 \|x_p\|^2. \tag{13}$$

For the decoded energy the result corresponding to (12) is $$\|\hat{y}_n\|^2 = \sum_{p,q=1}^{P} \langle b_{n,p}, b_{n,q}\rangle\langle \hat{x}_p, \hat{x}_q\rangle. \tag{14}$$

Inserting the predicted signals (4) in (14) and applying the assumption that the original signals are uncorrelated gives $$\|\hat{y}_n\|^2 \approx \sum_{p=1}^{P}\left(\sum_{q,r=1}^{P} a_{q,p} a_{r,p} \langle b_{n,q}, b_{n,r}\rangle\right)\|x_p\|^2. \tag{15}$$

What remains in order to be able to calculate the compensation gain given by the quotient (10) is to estimate the energy distribution $\|x_p\|^2$, p=1, 2, . . . , P of the original channels up to an arbitrary factor. The present invention teaches to do this by computing, as a function of the energy distribution, the prediction matrix $C_{model}$ corresponding to the assumption that these channels are uncorrelated and that the encoder aims at minimizing the prediction error. The energy distribution is then estimated by solving the nonlinear system of equations $C_{model}=C$ if possible. For prediction parameters that lead to a system of equations without solutions, the gain compensation factors are set to $g_n=1$. This inventive procedure will be detailed in the following section in the most important special case.

The computation load imposed by (15) can be reduced in the case where P=M+1 by applying the expansion (see for instance PCT/EP2005/011586), $$\langle x_p, x_q\rangle = \langle \hat{x}_p, \hat{x}_q\rangle + \Delta E \cdot v_p \cdot v_q, \tag{16}$$

where v is a unit vector with components $v_p$ such that Dv=O, and ΔE is the prediction loss energy, $$\Delta E = E - \hat{E} = \sum_{p=1}^{P}\|x_p\|^2 - \sum_{p=1}^{P}\|\hat{x}_p\|^2. \tag{17}$$

The computation of (15) is then advantageously replaced by the application of (16) in (14), leading to $$\|\hat{y}_n\|^2 \approx \|y_n\|^2 - \Delta E \cdot \left\|\sum_{p=1}^{P} v_p b_{n,p}\right\|^2. \tag{18}$$

Subsequently, a preferred specialization to prediction of three channels from two channels will be discussed. The case where M=2 and P=3 is used in MPEG Surround. The signals are a combined left $x_1=l$, a combined right $x_2=r$ and a (scaled) combined center/lfe channel $x_3=c$. The downmix matrix is $$D = \begin{bmatrix} 1 & 0 & 1 \\ 0 & 1 & 1 \end{bmatrix}, \tag{19}$$

and the prediction matrix is constructed from two transmitted real parameters $c_1$, $c_2$, according to $$C = \frac{1}{3}\begin{bmatrix} 2+c_1 & c_2-1 \\ c_1-1 & 2+c_2 \\ 1-c_1 & 1-c_2 \end{bmatrix}. \tag{20}$$

Under the assumption that the original channels are uncorrelated the prediction matrix realizing the minimal prediction error is given by $$C_{model} = \frac{1}{LC+RC+LR}\begin{bmatrix} LC+LR & -LC \\ -RC & RC+LR \\ RC & LC \end{bmatrix}. \tag{21}$$

Equating $C_{model}=C$ leads to the (unnormalized) energy distribution taught by the present invention $$\begin{bmatrix} L \\ R \\ C \end{bmatrix} = \begin{bmatrix} \beta(1-\sigma) \\ \alpha(1-\sigma) \\ p \end{bmatrix}, \tag{22}$$

where $\alpha=(1-c_1)/3$, $\beta=(1-c_2)/3$, $\sigma=\alpha+\beta$, and $p=\alpha\beta$. This holds in the viable range defined by $$\alpha>0, \beta>0, \sigma<1, \tag{23}$$

in which case the prediction error can be found in the same scaling from $$\Delta E = 3p(1-\sigma). \tag{24}$$

Since P=3=2+1=M+1, the method outlined by (16)-(18) is applicable. The unit vector is $[v_1, v_2, v_3]=[1, 1, -1]/\sqrt{3}$ and with the definitions.

$$\Delta E_n^B = p(1-\sigma)\|b_{n,1}+b_{n,2}-b_{n,3}\|^2, \tag{25}$$

and $$E_n^B = \beta(1-\sigma)\|b_{n,1}\|^2 + \alpha(1-\sigma)\|b_{n,2}\|^2 + p\|b_{n,3}\|^2, \tag{26}$$

the compensation gain for each ear n=1, 2 as computed in a preferred embodiment of the gain calculator 302 can be expressed by $$g_n = \begin{cases} \min\left\{g_{max}, \sqrt{\dfrac{E_n^B+\varepsilon}{E_n^B-\Delta E_n^B+\varepsilon}}\right\}, & \text{if } \alpha>0, \beta>0, \sigma<1; \\ 1, & \text{otherwise} \end{cases}. \tag{27}$$

Here ε>0 is a small number whose purpose is to stabilize the formula near the edge of the viable parameter range and $g_{max}$ is an upper limit on the applied compensation gain. The gains of (27) are different for the left and right ears, n=1, 2. A variant of the method is to use a common gain $g_0=g_1=g$, where $$g = \begin{cases} \min\left\{g_{max}, \sqrt{\dfrac{E_0^B+E_1^B+\varepsilon}{E_0^B+E_1^B-\Delta E_0^B-\Delta E_1^B+\varepsilon}}\right\}, & \text{if } \alpha>0, \beta>0, \sigma<1; \\ 1, & \text{otherwise.} \end{cases} \tag{28}$$

The inventive correction gain factor can be brought into coexistence with a straight-forward multichannel gain compensation available without any HRTF related issues.

In MPEG Surround, compensation for the prediction loss is already applied in the decoder by multiplying the upmix matrix C by a factor $1/\rho$ where $0<\rho\leq 1$ is a part of the transmitted spatial parameters. In that case the gains of (27) and (28) have to be replaced by the products $\rho g_n$ and $\rho g$ respectively. Such compensation is applied for the binaural decoding studied in FIGS. 5 and 6. It is the reason why the prior art decoding of FIG. 5 has boosted parts of the spectrum in comparison to the reference. For the subbands corresponding to those frequency regions, the inventive gain compensation effectively replaces the transmitted parameter gain factor $1/\rho$ with a smaller value derived from formula (28).

In addition, since the case where $\rho=1$ corresponds to a successful prediction, a more conservative variant of the gain compensation taught by the present invention will disable the binaural gain compensation for $\rho=1$.

Furthermore, the present invention is used together with a residual signal. In MPEG Surround, an additional prediction residual signal $z_3$ can be transmitted which makes it possible to reproduce the original P=3 signals $x_p$ more faithfully. In this case the gain compensation is to be replaced by a binaural residual signal addition which will now be outlined. The predictive upmix enhanced by a residual is formed according to $$\tilde{x}_p(k) = \sum_{m=1}^{2} c_{p,m} z_m(k) + w_p \cdot z_3(k), \tag{29}$$

where $[w_1, w_2, w_3]=[1, 1, -1]/3$. Substituting $\tilde{x}_p$ for $\hat{x}_p$ in (5) yields the corresponding combined filtering, $$\tilde{y}_n(k) = \sum_{m=1}^{3} (h_{n,m} * z_m)(k), \tag{30}$$

where the combined filters $h_{n,m}$ are defined by (7) for m=1, 2, and the combined filters for the residual addition are defined by $$h_{n,3}=\tfrac{1}{3}(b_{n,1}+b_{n,2}-b_{n,3}). \tag{31}$$

The overall structure of this mode of decoding is therefore also described by FIG. 2 by setting P=M=3, and by modifying the combiner 203 to perform only the linear combination defined by (7) and (31).

Figure 13:
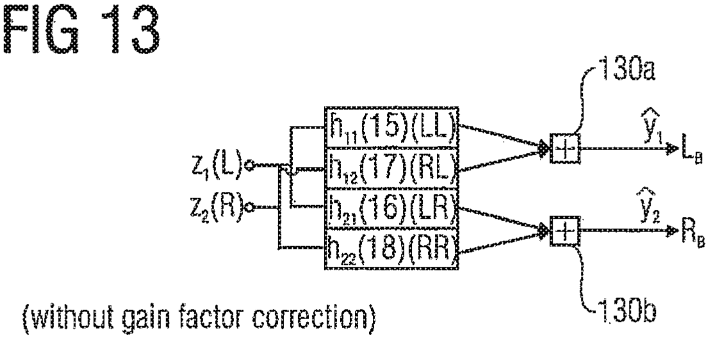
FIG. 13 illustrates filtering of two downmix channels using four filters to obtain binaural signals without gain factor correction.

FIG. 13 illustrates in a modified representation the result of the linear combiner 301 in FIG. 3. The result of the combiner are four HRTF-based filters $h_{11}$, $h_{12}$, $h_{21}$ and $h_{22}$. As will be clearer from the description of FIG. 16*a* and FIG. 17, these filters correspond to filters indicated by 15, 16, 17, 18 in FIG. 16*a*.

Figure 16A:
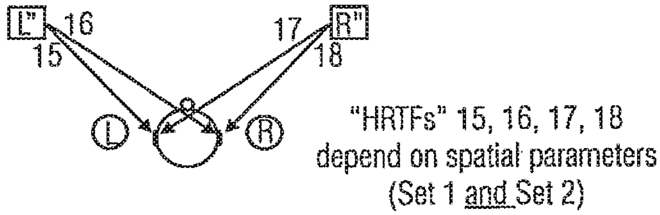
FIG. 16*a* illustrates the setup from FIG. 14 or FIG. 15, when a maximum combination of HRTF filters has been performed and only the four filters of FIG. 13 remain.

FIG. 16*a* shows a head of a listener having a left ear or a left binaural point and having a right ear or a right binaural point. When FIG. 16*a* would only correspond to a stereo scenario, then filters 15, 16, 17, 18 would be typical head related transfer functions which can be individually measured or obtained via the Internet or in corresponding textbooks for different positions between a listener and the left channel speaker and the right channel speaker.

However, since the present invention is directed to a multi-channel binaural decoder, filters illustrated by 15, 16, 17, 18 are not pure HRTF filters, but are HRTF-based filters, which not only reflect HRTF properties but which also depend on the spatial parameters and, particularly, as discussed in connection with FIG. 2, depend on the spatial parameter set 1 and the spatial parameter set 2.

Figure 14:
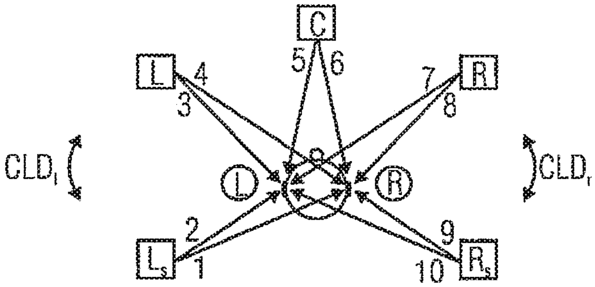
FIG. 14 illustrates a spatial setup for explaining different HRTF filters 1-10 in a five channels setup.

FIG. 14 shows the basis for the HRTF-based filters used in FIG. 16*a*. Particularly, a situation is illustrated where a listener is positioned in a sweet spot between five speakers in a five channel speaker setup which can be found, for example, in typical surround home or cinema entertainment systems. For each channel, there exist two HRTFs which can be converted to channel impulse responses of a filter having the HRTF as the transfer function. Particularly as it is known in the art, an HRTF-based filter accounts for the sound propagation within the head of a person so that, for example, HRTF1 in FIG. 14 accounts for the situation that a sound emitted from speaker $L_s$ meets the right ear after having passed around the head of the listener. Contrary thereto, the sound emitted from the left surround speaker $L_s$ meets the left ear almost directly and is only partly affected by the position of the ear at the head and also the shape of the ear etc. Thus, it becomes clear that the HRTFs 1 and 2 are different from each other.

The same is true for the HRTFs 3 and 4 for the left channel, since the relations of both ears to the left channel L are different. This also applies for all other HRTFs, although as becomes clear from FIG. 14, the HRTFs 5 and 6 for the center channel will be almost identical or even completely identical to each other, unless the individual listeners asymmetry is accommodated by the HRTF data.

As stated above, these HRTFs have been determined for model heads and can be downloaded for any specific "average head", and loudspeaker setup.

Figure 15:
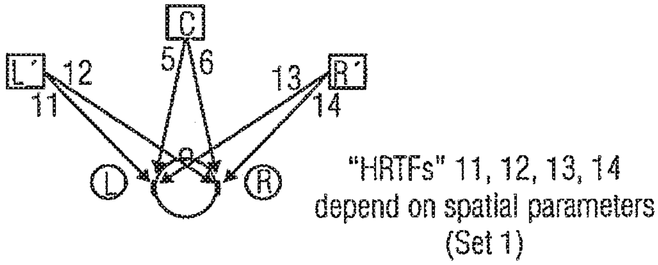
FIG. 15 illustrates a situation of FIG. 14, when the channels for L, Ls and R, Rs have been combined.
Figures 16B, 17:
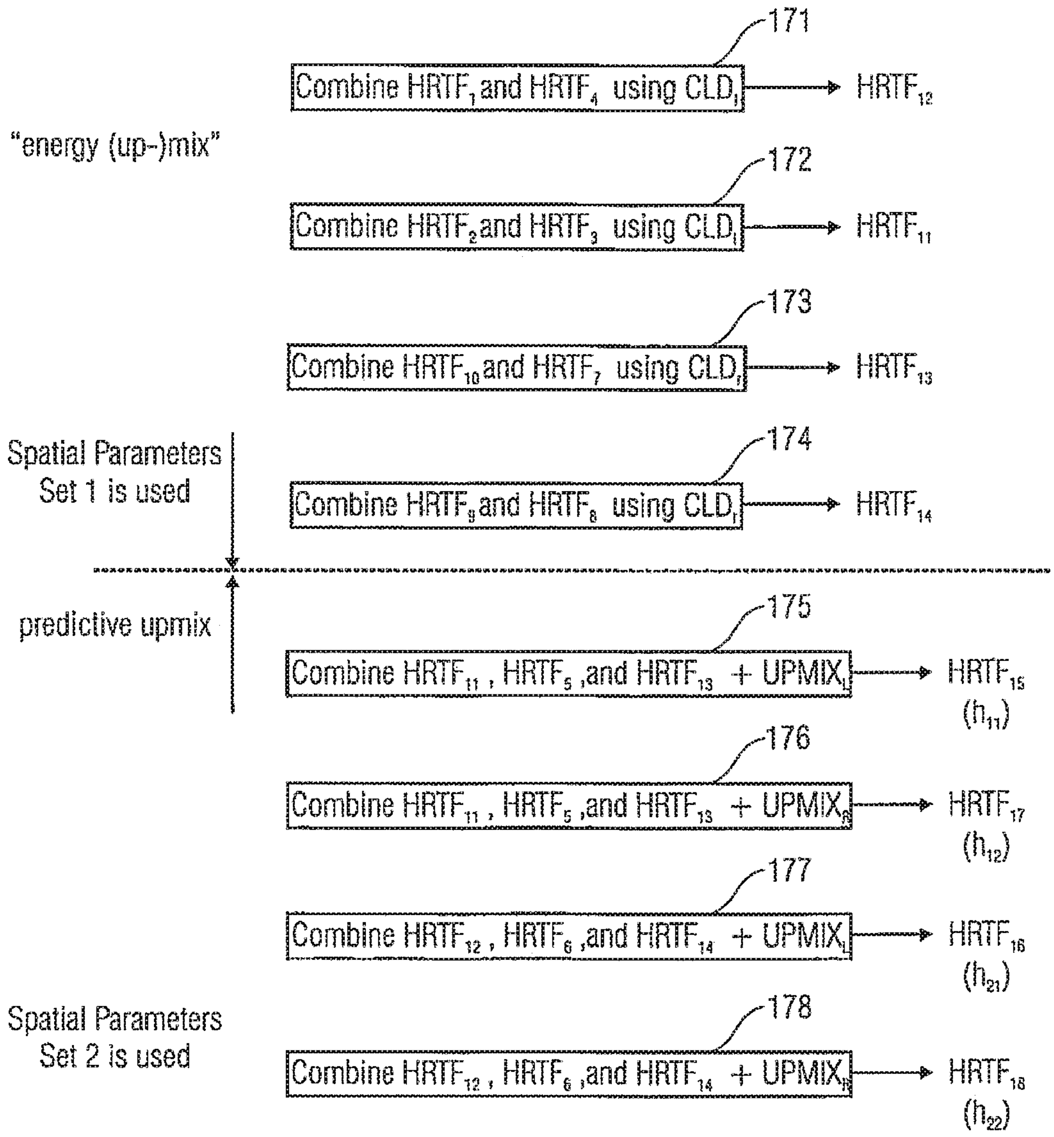
FIG. 16*b* illustrates an upmix rule as determined by the FIG. 20 encoder having upmix coefficients resulting in a non-energy-conserving upmix.
FIG. 17 illustrates how HRTF filters are combined to finally obtain four HRTF-based filters.

Now, as becomes clear at 171 and 172 in FIG. 17, a combination takes place to combine the left channel and the left surround channel to obtain two HRTF-based filters for the left side indicated by L' in FIG. 15. The same procedure is performed for the right side as illustrated by R' in FIG. 15 which results in HRTF 13 and HRTF 14. To this end, reference is also made to item 173 and item 174 in FIG. 17. However, it is to be noted here that, for combining respective HRTFs in items 171, 172, 173 and 174, inter channel level difference parameters reflecting the energy distribution between the L channel and the Ls channel of the original setup or between the R channel and the Rs channel of the original multi-channel setup are accounted for. Particularly, these parameters define a weighting factor when HRTFs are linearly combined.

As outlined before, a phase factor can also be applied when combining HRTFs, which phase factor is defined by time delays or unwrapped phase differences between the to be combined HRTFs. However, this phase factor does not depend on the transmitted parameters.

Thus, HRTFs 11, 12, 13 and 14 are not true HRTFs filters but are HRTF-based filters, since these filters not only depend from the HRTFs, which are independent from the transmitted signal. Instead, HRTFs 11, 12, 13 and 14 are also dependent on the transmitted signal due to the fact that the channel level difference parameters $cld_l$ and $cld_r$ are used for calculating these HRTFs 11, 12, 13 and 14.

Now, the FIG. 15 situation is obtained, which still has three channels rather than two transmitted channels as included in a preferred down-mix signal. Therefore, a combination of the six HRTFs 11, 12, 5, 6, 13, 14 into four HRTFs 15, 16, 17, 18 as illustrated in FIG. 16*a* has to be done.

To this end, HRTFs 11, 5, 13 are combined using a left upmix rule, which becomes clear from the upmix matrix in FIG. 16*b*. Particularly the left upmix rule as shown in FIG. 16*b* and as indicated in block 175 includes parameters $m_{11}$, $m_{21}$ and $m_{31}$. This left upmix rule is in the matrix equation of FIG. 16 only for being multiplied by the left channel. Therefore, these three parameters are called the left upmix rule.

As outlined in block 176, the same HRTFs 11, 5, 13 are combined, but now using the right upmix rule, i.e., in the FIG. 16*b* embodiment, the parameters $m_{12}$, $m_{22}$ and $m_{32}$, which all are used for being multiplied by the right channel $R_0$ in FIG. 16*b*.

Thus, HRTF 15 and HRTF 17 are generated. Analogously HRTF 12, HRTF 6 and HRTF 14 of FIG. 15 are combined using the upmix left parameters $m_{11}$, $m_{21}$ and $m_{31}$ to obtain HRTF 16. A corresponding combination is performed using HRTF 12, HRTF, 6 HRTF 14, but now with the upmix right parameters or right upmix rule indicated by $m_{12}$, $m_{22}$ and $m_{32}$ to obtain HRTF 18 of FIG. 16*a*.

Again, it is emphasized that, while original HRTFs in FIG. 14 did not at all depend on the transmitted signal, the new HRTF-based filters 15, 16, 17, 18 now depend on the transmitted signal, since the spatial parameters included in the multi-channel signal were used for calculating these filters 15, 16, 17 and 18.

To finally obtain a binaural left channel $L_B$ and a binaural right channel $R_B$, the outputs of filters 15 and 17 have to be combined in an adder 130*a*. Analogously, the output of the filters 16 and 18 have to be combined in an adder 130*b*. These adders 130*a*, 130*b* reflect the superposition of two signals within the human ear.

Figure 18:
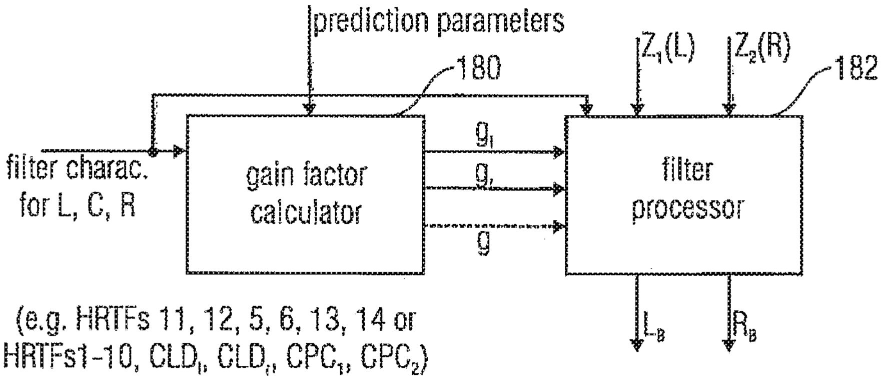
FIG. 18 illustrates a preferred embodiment of an inventive multi-channel decoder.

Subsequently, FIG. 18 will be discussed. FIG. 18 shows a preferred embodiment of an inventive multi-channel decoder for generating a binaural signal using a downmix signal derived from an original multi-channel signal. The downmix signal is illustrated at $z_1$ and $z_2$ or is also indicated by "L" and "R". Furthermore, the downmix signal has parameters associated therewith, which parameters are at least a channel level difference for left and left surround or a channel level difference for right and right surround and information on the upmixing rule.

Naturally, when the original multi-channel signal was only a three-channel signal, $cld_l$ or $cld_r$ are not transmitted and the only parametric side information will be information on the upmix rule which, as outlined before, is such an upmix rule which results in an energy-error in the upmixed signal. Thus, although the waveforms of the upmixed signals when a non-binaural rendering is performed, match as close as possible the original waveforms, the energy of the upmixed channels is different from the energy of the corresponding original channels.

In the preferred embodiment of FIG. 18, the upmix rule information is reflected by two upmix parameters $cpc_1$, $cpc_2$. However, any other upmix rule information could be applied and signaled via a certain number of bits. Particularly, one could signal certain upmix scenarios and upmix parameters using a predetermined table at the decoder so that only the table indices have to be transmitted from an encoder to the decoder. Alternatively, one could also use different upmixing scenarios such as an upmix from two to more than three channels. Alternatively, one could also transmit more than two predictive upmix parameters which would then require a corresponding different downmix rule which has to fit to the upmix rule as will be discussed in more detail with respect to FIG. 20.

Irrespective of such a preferred embodiment for the upmix rule information, any upmix rule information is sufficient as long as an upmix to generate an energy-loss affected set of upmixed channels is possible, which is waveform-matched to the corresponding set of original signals.

The inventive multi-channel decoder includes a gain factor calculator 180 for calculating at least one gain factor $g_l$, $g_r$ or g, for reducing or eliminating the energy-error. The gain factor calculator calculates the gain factor based on the upmix rule information and filter characteristics of HRTF-based filters corresponding to upmix channels which would be obtained, when the upmix rule would be applied. However, as outlined before, in the binaural rendering, this upmix does not take place. Nevertheless, as discussed in connection with FIG. 15 and blocks 175, 176, 177, 178 of FIG. 17, HRTF-based filters corresponding to these upmix channels are nevertheless used.

As discussed before, the gain factor calculator 180 can calculate different gain factors $g_l$ and $g_r$ as outlined in equation (27), when, instead of n, l or r is inserted. Alternatively, the gain factor calculator could generate a single gain factor for both channels as indicated by equation (28).

Importantly, the inventive gain factor calculator 180 calculates the gain factor based not only on the upmix rule, but also based on the filter characteristics of the HRTF-based filters corresponding to upmix channels. This reflects the situation that the filters themselves also depend on the transmitted signals and are also affected by an energy-error. Thus, the energy-error is not only caused by the upmix rule information such as the prediction parameters $CPC_1$, $CPC_2$, but is also influenced by the filters themselves.

Therefore, for obtaining a well-adapted gain correction, the inventive gain factor not only depends on the prediction parameter but also depends on the filters corresponding to the upmix channels as well.

The gain factor and the downmix parameters as well as the HRTF-based filters are used in the filter processor 182 for filtering the downmix signal to obtain an energy-corrected binaural signal having a left binaural channel $L_B$ and having a right binaural channel $R_B$.

In a preferred embodiment, the gain factor depends on a relation between the total energy included in the channel impulse responses of the filters corresponding to upmix channels to a difference between this total energy and an estimated upmix energy error ΔE. ΔE can preferably be calculated by combining the channel impulse responses of the filters corresponding to upmix channels and to then calculating the energy of the combined channel impulse response. Since all numbers in the relations for $G_L$ and $G_R$ in FIG. 18 are positive numbers, which becomes clear from the definitions for ΔE and E, it is clear that both gain factors are larger than 1. This reflects the experience illustrated in FIG. 5 that, in most times, the energy of the binaural signal is lower than the energy of the original multi-channel signal. It is also to note, that even when the multi-channel gain compensation is applied, i.e., when the factor ρ is used in most signals, nevertheless an energy-loss is caused.

Figure 19A:
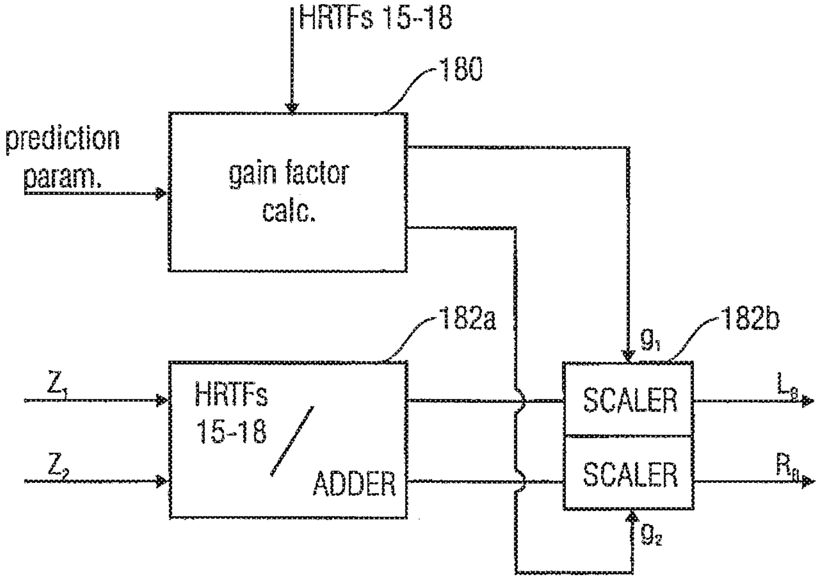
FIG. 19*a* illustrates a first embodiment of the inventive multi-channel decoder having a scaling stage after HRTF-based filtering without gain correction.

FIG. 19*a* illustrates a preferred embodiment of the filter processor 182 of FIG. 18. Particularly, FIG. 19*a* illustrates the situation, when in block 182*a* the combined filters 15, 16, 17, and 18 of FIG. 16*a* without gain compensation are used and the filter output signals are added as outlined in FIG. 13. Then, the output of box 182*a* is input into a scaler box 182*b* for scaling the output using the gain factor calculated by box 180.

Figure 19B:
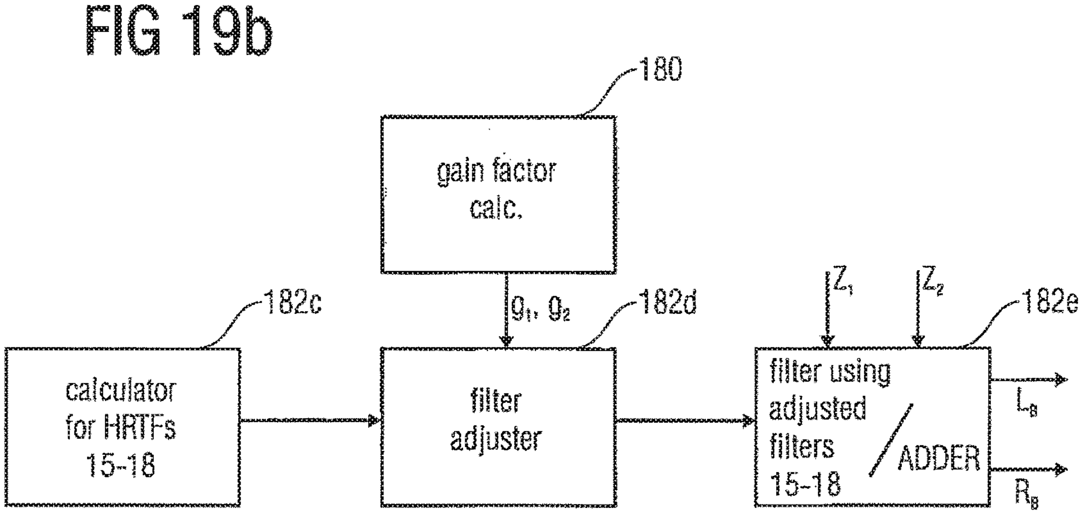
FIG. 19*b* illustrates an inventive device having adjusted HRTF-based filters which result in a gain-adjusted filter output signal.

Alternatively, the filter processor can be constructed as shown in FIG. 19*b*. Here, HRTFs 15 to 18 are calculated as illustrated in box 182*c*. Thus, the calculator 182*c* performs the HRTF combination without any gain adjustment. Then, a filter adjuster 182*d* is provided, which uses the inventively calculated gain factor. The filter adjuster results in adjusted filters as shown in block 180*e*, where block 180*e* performs the filtering using the adjusted filter and performs the subsequent adding of the corresponding filter output as shown in FIG. 13. Thus, no post-scaling as in FIG. 19*a* is necessary to obtain gain-corrected binaural channels $L_B$ and $R_B$.

Generally, as has been outlined in connection with equation 16, equation 17 and equation 18, the gain calculation takes place using the estimated upmix error ΔE. This approximation is especially useful for the case where the number of upmix channels is equal to the number of downmix channels +1. Thus, in case of two downmix channels, this approximation works well for three upmix channels. Alternatively, when one would have three downmix channels, this approximation would also work well in a scenario in which there are four upmix channels.

However, it is to be noted that the calculation of the gain factor based on an estimation of the upmix error can also be performed for scenarios in which for example, five channels are predicted using three downmix channels. Alternatively, one could also use a prediction-based upmix from two downmix channels to four upmix channels. Regarding the estimated upmix energy-error ΔE, one can not only directly calculate this estimated error as indicated in equation (25) for the preferred case, but one could also transmit some information on the actually occurred upmix error in a bit stream. Nevertheless, even in other cases than the special case as illustrated in connection with equations (25) to (28), one could then calculate the value $E_n^B$ based on the HRTF-based filters for the upmix channels using prediction parameters. When equation (26) is considered, it becomes clear that this equation can also easily be applied to a 2/4 prediction upmix scheme, when the weighting factors for the energies of the HRTF-based filter impulse responses are correspondingly adapted.

In view of that, it becomes clear that the general structure of equation (27), i.e., calculating the gain factor based on relation of $E^B/(E^B-\Delta E^B)$ also applies for other scenarios.

Subsequently, FIG. 20 will be discussed to show a schematic implementation of a prediction-based encoder which could be used for generating the downmix signal L, R and the upmix rule information transmitted to a decoder so that the decoder can perform the gain compensation in the context of the binaural filter processor.

A downmixer 191 receives five original channels or, alternatively, three original channels as illustrated by ($L_s$ and $R_s$). The downmixer 191 can work based on a pre-determined downmix rule. In that case, the downmix rule indication as illustrated by line 192 is not required. Naturally, the error-minimizer 193 could vary the downmix rule as well in order to minimize the error between reconstructed channels at the output of an upmixer 194 with respect to the corresponding original input channels.

Thus, the error-minimizer 193 can vary the downmix rule 192 or the upmixer rule 196 so that the reconstructed channels have a minimum prediction loss ΔE. This optimization problem is solved by any of the well-known algorithms within the error-minimizer 193, which preferably operates in a subband-wise way to minimize the difference between the reconstruction channels and the input channels.

As stated before, the input channels can be original channels L, $L_s$, R, $R_s$, C. Alternatively the input channels can only be three channels L, R, C, wherein, in this context, the input channels L, R, can be derived by corresponding OTT boxes illustrated in FIG. 11. Alternatively, when the original signal only has channels L, R, C, then these channels can also be termed as "original channels".

Figure 20:
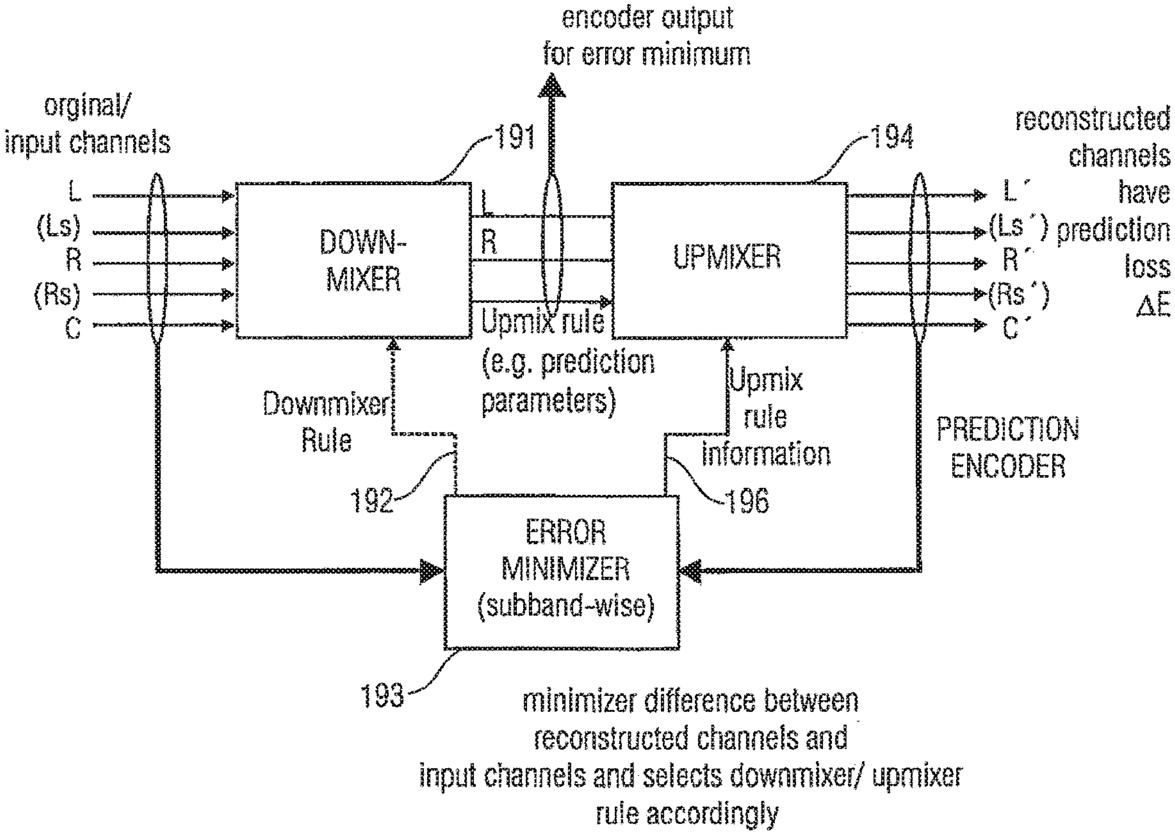
FIG. 20 shows an example for an encoder generating the information for a non-energy-conserving upmix rule.

FIG. 20 furthermore illustrates that any upmix rule information can be used besides the transmission of two prediction parameters as long as a decoder is in the position to perform an upmix using this upmix rule information. Thus, the upmix rule information can also be an entry into a lookup table or any other upmix related information.

The present invention therefore, provides an efficient way of performing binaural decoding of multi-channel audio signals based on available downmixed signals and additional control data by means of HRTF filtering. The present invention provides a solution to the problem of spectral coloring arising from the combination of predictive upmix with binaural decoding.

Depending on certain implementation requirements of the inventive methods, the inventive methods can be implemented in hardware or in software. The implementation can be performed using a digital storage medium, in particular a disk, DVD or a CD having electronically readable control signals stored thereon, which cooperate with a programmable computer system such that the inventive methods are performed. Generally, the present invention is, therefore, a computer program product with a program code stored on a machine readable carrier, the program code being operative for performing the inventive methods when the computer program product runs on a computer. In other words, the inventive methods are, therefore, a computer program having a program code for performing at least one of the inventive methods when the computer program runs on a computer.

While the foregoing has been particularly shown and described with reference to particular embodiments thereof, it will be understood by those skilled in the art that various other changes in the form and details may be made without departing from the spirit and scope thereof. It is to be understood that various changes may be made in adapting to different embodiments without departing from the broader concepts disclosed herein and comprehended by the claims that follow.

The invention claimed is:

1. A multi-channel decoder apparatus for generating a binaural signal from an input signal derived from an original multi-channel signal using parameters, the apparatus comprising:

a gain factor calculator for calculating at least one gain factor for reducing or eliminating an energy-error, wherein the at least one gain factor is calculated based on weighting parameters related to input channels of the input signal, and wherein each weighting parameter is determined for an ear and a respective input channel; and a filter processor for filtering the input signal using the at least one gain factor to obtain an energy-corrected binaural signal, wherein the at least one gain factor is calculated based on a weighted linear combination of energies of input channel impulse responses of filters derived from binaural filters related to a binaural channel, wherein the decoder is compatible to operate in accordance with a standard set by a MPEG standard setting organizational body.

2. The apparatus of claim 1, wherein the binaural filters are based on head related transfer function based filters.

3. A method of multi-channel decoding for generating a binaural signal from an input signal derived from an original multi-channel signal using parameters, the method comprising:

calculating at least one gain factor for reducing or eliminating an energy-error, wherein the at least one gain factor is calculated based on weighting parameters related to input channels of the input signal, and wherein each weighting parameter is determined for an ear and a respective input channel; and filtering the input signal using the at least one gain factor to obtain an energy-corrected binaural signal, wherein the at least one gain factor is calculated based on a weighted linear combination of energies of input channel impulse responses of filters derived from binaural filters related to a binaural channel, wherein the decoding method is compatible with a standard set by a MPEG standard setting organizational body.

4. A computer readable memory device embodying instructions for executing the method in accordance with claim 3.

* * * * *